US005906500A

United States Patent [19]
Kakuta et al.

[11] Patent Number: 5,906,500
[45] Date of Patent: May 25, 1999

[54] CHARGING CONNECTOR FOR ELECTRIC VEHICLE

[75] Inventors: Naoki Kakuta; Nobuaki Yoshioka, both of Shizuoka, Japan

[73] Assignee: Yazaki Corporation, Tokyo, Japan

[21] Appl. No.: 08/943,522

[22] Filed: Oct. 3, 1997

[30] Foreign Application Priority Data

Oct. 4, 1996 [JP] Japan .................................. 8-264683

[51] Int. Cl.⁶ .................................................. H01R 13/62
[52] U.S. Cl. ............................................................. 439/310
[58] Field of Search ..................................... 439/310, 138, 439/352, 372, 136, 142, 357, 34, 35, 131

[56] References Cited

FOREIGN PATENT DOCUMENTS 7-192802  7/1995  Japan .

Primary Examiner—Steven L. Stephan
Assistant Examiner—Eugene G. Byrd
Attorney, Agent, or Firm—Armstrong, Westerman, Hattori, McLeland & Naughton

[57] ABSTRACT

In a charging connector for an electric vehicle for charging a power receiving connector coupled with a power supplying connector, the power supplying connector includes an outer housing to be coupled with said power receiving connector; an inner housing to be slidably mounted on the front half and housing a plurality of terminals; and an air cylinder mounted inside said outer housing inside the rear half of said outer housing and a piston connected to the rear end of said inner housing. Whereby the inner housing is driven toward said power receiving connector by the operation of said air cylinder so that said terminals are connected to corresponding terminals of said power receiving connector. In such a configuration, since the advancing drive of an inner housing in which terminals are housed is carried out using the air cylinder, a small number of components can be used and the piston has only to be connected to the rear end of the inner housing, thus simplifying the production cost and reducing the production cost.

8 Claims, 7 Drawing Sheets

CHARGING CONNECTOR FOR ELECTRIC VEHICLE

BACKGROUND OF THE INVENTION

1. Field of the Invention

The present invention relates to a charging connector for an electric vehicle, and more particularly to a charging connector in which a power supplying connector located on a charging stand has a simplified internal structure and can be coupled with a power receiving connector on the side of a vehicle body by small force.

2. Description of the Prior Art

A power supplying connector 51 as shown in FIG. 7 has been proposed which is used in a manner coupled with the power receiving connector of an electric vehicle (JP-A-192802).

This power supplying connector 51 is composed of a pair of split-type cases 52, 52'. Within the front half of the cases, a connector body 53 in which terminals are housed is slidably mounted, whereas within the rear half thereof, a straight tube segment of a handle 54 is slidably mounted. Lead wires to be connected to the above terminals are passed through the handle 54. Further, the acting portion of a lever 55 is coupled with the straight tube. By rotating the operating portion 55a which extends outwardly from the cases, the handle 54 can be moved with small force by a lever action of the lever 55.

Since the power supplying connector 51 is coupled with the power receiving connector by the lever action of the lever 55, they can be coupled with or separated from each other with relatively small force.

However, the above configuration has the following disadvantage. The handle 54 as well as the connector body 53 must be mounted in the split-type cases 52, 52'. In addition, in order to move the handle 54 smoothly, the lead wires for the terminals must be passed through the inside of the handle 54. Thus, the internal structure of the power supplying connector will be complicated and the production cost will be increased. Further, remarkable force is required regardless of using the lever 55.

SUMMARY OF THE INVENTION

The present invention has been accomplished in order to solve the above problems.

An object of the present invention is to provide a charging connector for an electric vehicle, in which a power supplying connector to be coupled with a power receiving connector on the side of a vehicle body has a simplified internal structure to enabling reduction in production cost can be coupled with a power receiving connector by small force.

In order to attain the above object, in accordance with the present invention, there is provided a charging connector for an electric vehicle for charging a power receiving connector coupled with a power supplying connector, wherein said power supplying connector comprises: an outer housing to be coupled with said power receiving connector; an inner housing to be slidably mounted on the front half and housing a plurality of terminals; and an air cylinder mounted inside said outer housing inside the rear half of said outer housing and a piston connected to the rear end of said inner housing, whereby said inner housing is driven toward said power receiving connector by the operation of said air cylinder so that said terminals are connected to corresponding terminals of said power receiving connector.

In accordance with such a configuration, since the advancing drive of an inner housing in which terminals are housed is carried out using the air cylinder, a small number of components can be used and the piston has only to be connected to the rear end of the inner housing, thus simplifying the production cost and reducing the production cost. In addition, since substantial coupling of the power supplying connector with the power receiving connector is performed by air pressure, a worker has only to make a switching operation and can easily execute the coupling with less force.

Preferably, in the above configuration, said inner housing is provided with a rear holder covering an opening of its rear end through which said piston is coupled with said inner housing. In this case, since the inner housing and the air cylinder for driving it are coupled through the rear holder, the connecting structure can be simplified and the connecting operation is easy.

Preferably, in the above configuration, a return spring arranged is between a front wall of said air cylinder and said piston shaft and serving to urge said piston shaft toward the side opposite to said inner housing. In this case, when the air cylinder is exhausted, the power receiving connector can be easily taken off from the power supplying connector by the resilient force of the return spring.

In the above configuration, preferably, said air cylinder is provided with a pair of approximate switches for determining the stroke of said piston or said inner housing. In this case, setting the approximate switches permits the coupling depth of the power supplying connector for the power receiving connector to be suitably adjusted.

The above and other objects and features of the present invention will be more apparent from the following description taken in conjunction with the accompanying drawings.

DESCRIPTION OF THE PREFERRED EMBODIMENTS

Figure 1:
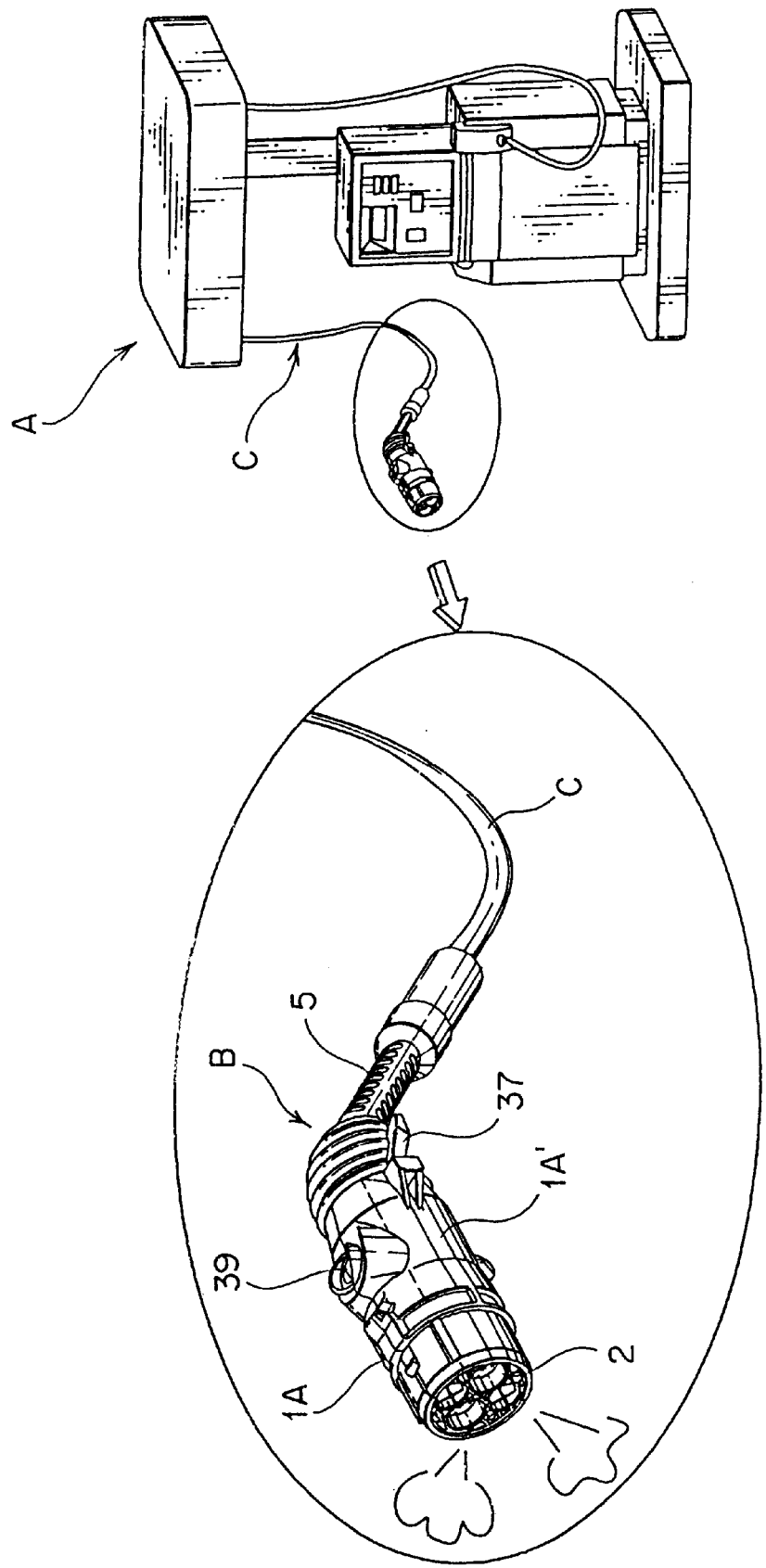
FIG. 1 is a schematic perspective view of a charging stand and a power supplying connector according to the present invention.

Now referring to the drawings, an explanation will be given of the preferred embodiments.

In FIG. 1, reference symbol A denotes a charging stand for an electric vehicle and reference symbol B denotes a power supplying connector to be fit into a power receiving connector (not shown). A cab tire cable C incorporating an electric wire and an air tube is connected to the power supplying connector B.

Figure 2:
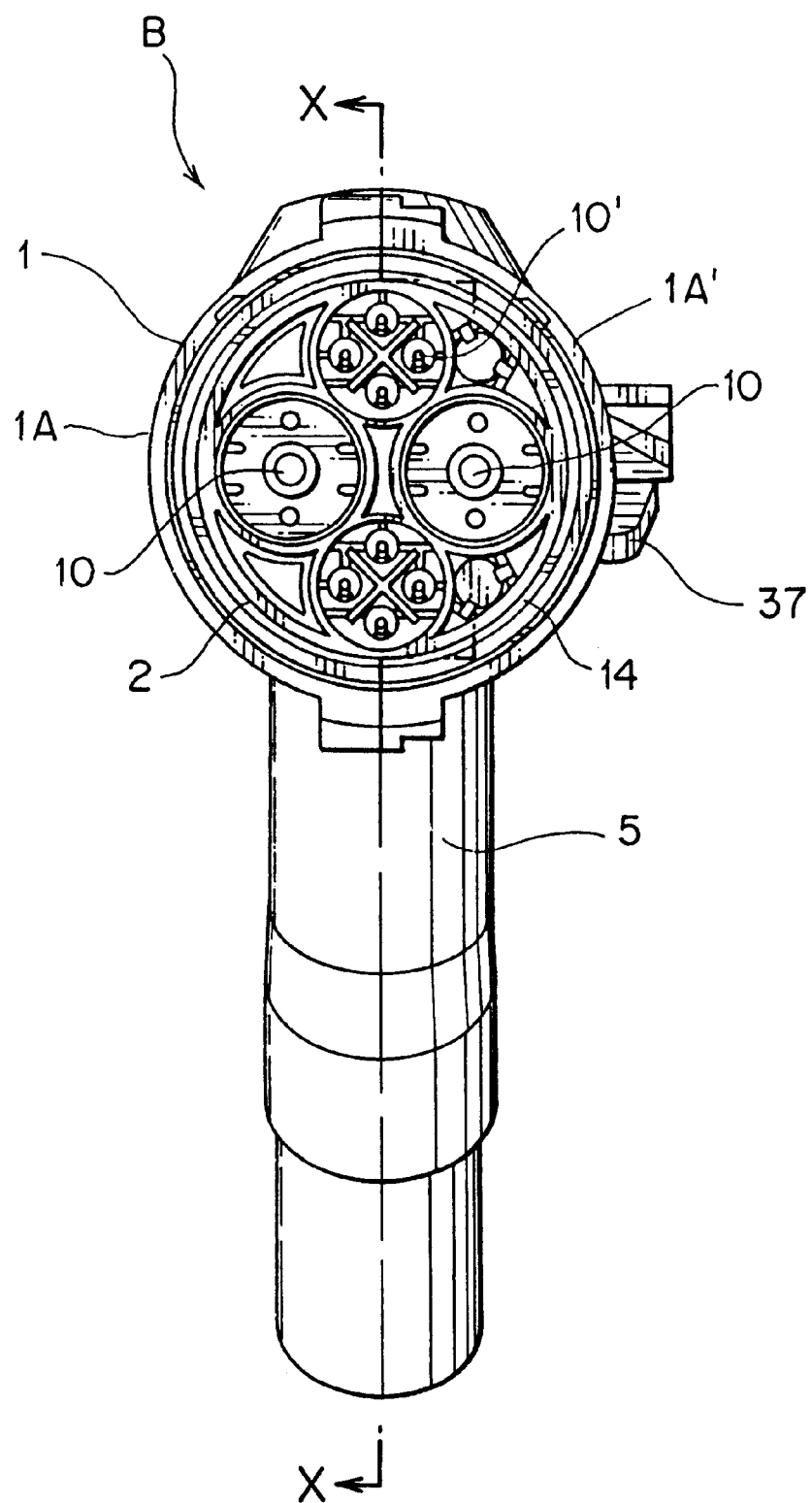
FIG. 2 is a front view of the power supplying connector shown in FIG. 1.
Figure 3:
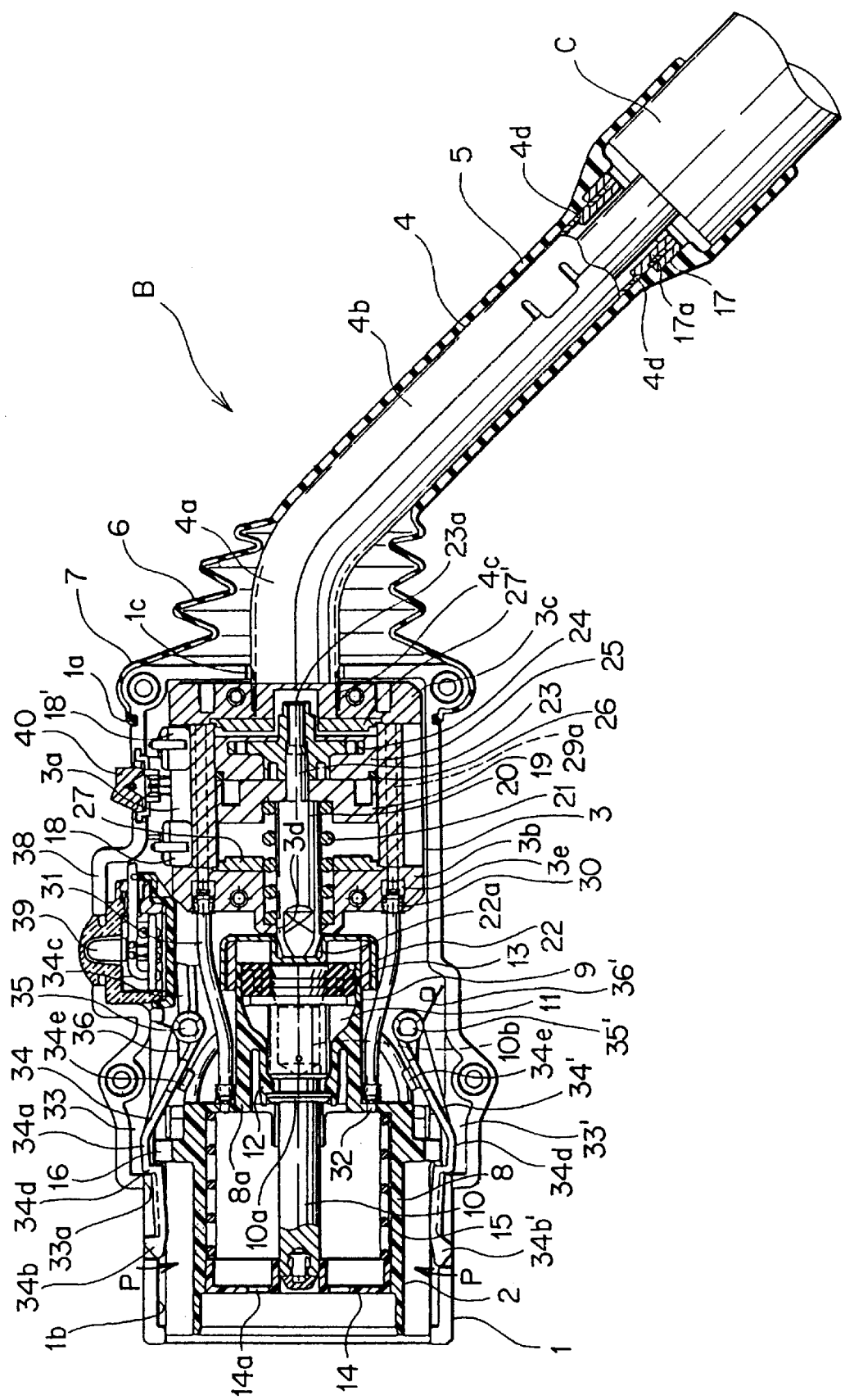
FIG. 3 is a sectional view taken in line X—X of the power supplying connector shown in FIG. 2.

As shown in FIGS. 2 and 3, the power supplying connector B is provided with an outer housing 1 composed of a pair of split type housings 1A and 1A' opposite to each other.

At the front half of the outer housing 1, an inner housing 2 is slidably attached on its inner wall, whereas at the rear half thereof, a spring return type air cylinder 3 is incorporated. The air cylinder 3 serves to move the inner housing 2 toward the receiving connector.

The air cylinder 3 is provided, at it rear end, with a handle 4 with the cab tire cable C being inserted. On the outer periphery of the handle 4, a grip 5 of a resilient material such as synthetic resin is mounted. A water-proof cap 7 communicating with the one end of the grip 5 through a corrugate or bellows portion 6 is fit into a circular groove 1a formed at the rear end 1a of the outer housing 1 so that the connecting portion of the split-type housings 1A and 1A' and the handle 4 is watertightly sealed.

The inner housing 2 is formed in a stepped-cylinder composed of a front large-diameter hood 8 and a rear small-diameter terminal holding portion 9.

On both left and right sides of the front hood 8, large-diameter power terminals 10 are arranged, whereas on the upper and lower sides, signal terminals 10' (represented by "10") are arranged. In the rear terminal holding portion 9, terminal chambers corresponding to the respective terminals 10 are partition-formed. In each of the terminal chambers, a pair of opposite flexible securing arms 12 are engaged with the flange 10a of each terminal 10. A male terminal as shown, which is used as the power terminal 10, can be replaced by a female terminal. This applies to the signal terminal 10'.

The electric wire connecting portion 10b at the rear half of the power terminal 10 is connected to electric wires 41, 42 (FIG. 5) of the cab tire cable C by crimping. In addition, a waterproof rubber stopper 13 is fit over the electric wire connecting portion 10b to seal each terminal chamber 11 watertightly, thereby preventing short-circuiting among the terminals.

An insulator cap 14 for interrupting the power terminal 10 from the outside is inserted into and slidably engaged with the front end of the hood 8 in an axial direction. Between the insulator cap 14 and the bottom 8a of the hood, a spring 15 for urging the cap 14 forward is mounted. The insulator cap 14 is provided with a take-out hole 14a serving as an exhaust hole.

On the other hand, at the rear end of the outer periphery of the hood 8 in the inner housing 2, a flange 16 in slidable contact with the inner wall 1b of the outer housing 1 is formed circumferencially, and is engaged with locking arms 34, 34' for provisional engagement described later.

The handle 4 is composed of a front straight tube segment 4a and a rear <-shaped inclined tube segment 4b. The handle 4 serves as a protector for the electric wires 41, 42 and air tubes 43. The front straight tube segment 4a passes slidably through the hole 1c of the rear end of the outer housing 1 so that the male screw 4c formed at the tip thereof is fixedly screwed to the female screw provided at the rear wall 3c provided at the spring-return type air cylinder 3. The inclined tube segment 4b is provided with a pair of engagement holes at its rear end so that the protective cases 17 of the cable C are secured by the engagement piece 17a.

Figure 4:
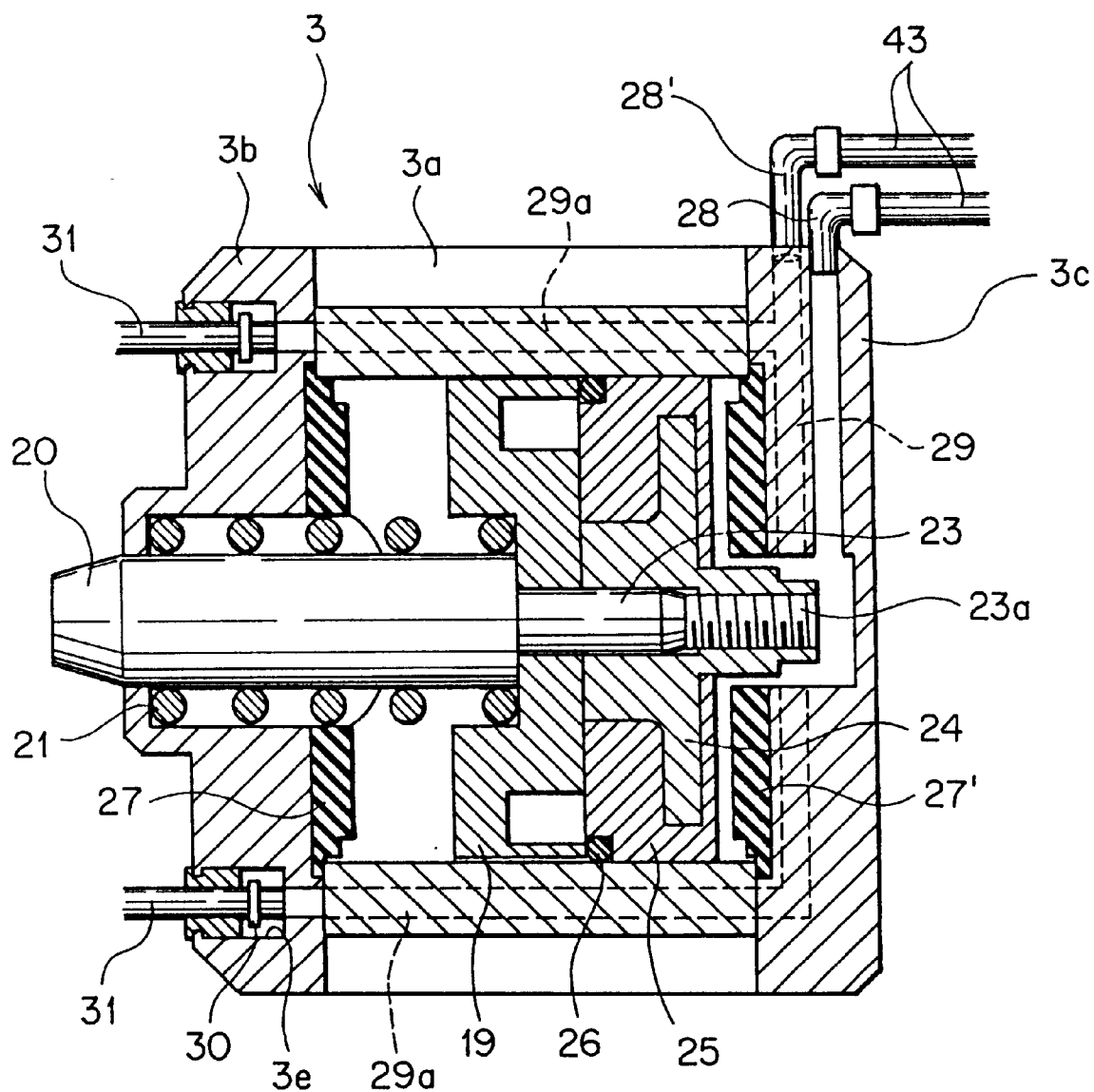
FIG. 4 is an enlarged view of the main part of a connecting structure of an air cylinder 3 and an air tube 43 in FIG. 3.

As seen from FIG. 4, the air cylinder 3 is composed of a cylindrical circumferencial wall 3a, and a front wall 3b and a rear wall 3c which close both ends thereof. On the outer face of the circumferential wall 3a, a pair of cylinder positioning proximity switches 18, 18' are provided, and within the air cylinder 3, a piston 19 is slidably mounted in an axial direction.

A return spring 21 is wound on a main shaft 20 of the piston 19. The main shaft 20 passes through the sliding hole 3d of the front wall 3b. The tip of the main shaft 20 is in contact with the rear holder 22 made of a metallic cap covering the rear opening of the terminal holding portion 9 of the inner housing 2. Namely, the rear holder 22 prevents the power terminal 10 as well as the flexible engagement arm 12 from coming off backward. The rear holder 22 is provided with a circular engagement groove 22a at its center, and the bottom of the groove is in contact with the tip of the main shaft 20.

The axial movable range of the piston 19, i.e. the stroke of the inner housing 2 which is moved forward by the main shaft 20 is determined by the detection signals from the proximity switches 18, 18'.

The auxiliary shaft 23 of the piston 19 has a screw portion 23a at its tip to be screwed to a bearing 24. The bearing 24 is supported by a bearing guide 25 with an O-ring 26 mounted on its periphery. Reference numerals 27, 27' denote shock absorber plates.

Two connection tubes 28, 28' are attached to the rear end of the peripheral wall 3a of the air cylinder 3.

The one connection tube 28 is communicated with the interior of the air cylinder 3, whereas the other connection tube 28' is connected to a communication hole 29 provided in the cylinder rear wall 3c. The communication hole 29 is communicated with the rear ends of a pair of air vents 29a opposite to each other provided within the peripheral wall 3a. The front end of each air vent extends to an opening 3e of the front wall 3b of the cylinder front wall 3b and is connected to the rear end of the air tube 31 for purging through a joint 30. The front end of the air tube 31 is connected to an air purge jet tip 32 provided at the hood bottom 8a of the inner housing 2.

The above two connection tubes 28 and 28' are connected to air tubes 43 (FIG. 5) described later of the cab tire cable C.

At the upper and lower intermediate positions of the split-type housings 1A, 1A' (represented by 1A), locking chambers 33 and 33' are formed to swell out. Within the chambers, a pair of locking arms 34 and 34' for provisionally locking the power receiving connector B are provided so that they can be rotated by pin shafts 35 and 35'. They are urged toward the side of the inner housing 2 as indicated by an arrow P by coil springs 36 and 36'.

The one locking arm 34 is configured so that its front half 34a extends from the front end opening 33a of the locking chamber 33 to the outer periphery of the outer housing 1 and is provided with a protruding hook-shaped engagement piece 34b, and its rear half 34c serves an engagement piece for the lock releasing lever 37 (see FIGS. 1 and 2). The front half 34a of the locking arm 34 includes a level difference portion 34d bent outwards between the fulcrum (pin shaft 35) and the securing piece 34b and a spring securing piece 34e having a ]-shape section oriented toward the inner housing 2.

The spring securing piece 34e is provided with a plate spring not shown. In coupling the power supplying connector B with the power receiving connector (not shown), the plate spring rotates upward when the driving pin within the power receiving connector pushes the follower pin within the power supplying connector into the power receiving connector against the spring, thereby rotating the locking arms 34 and 34' in a direction opposite to arrow P. The driving mechanism composed of the plate spring and the driving pin and follower pin is disclosed in JP-A-7-192802, and is not shown for simplicity of illustration.

Like the locking arm 34, the other locking arm 34' is configured so that its front half extends from the front end opening of the locking chamber 33' to the outer periphery of the outer housing 1 and is provided with a protruding semi-locking type hill-shaped securing piece 34b', and includes a level difference portion 34d and a spring securing piece 34e at its intermediate area. The rear end is axially supported by the pin shaft 35' within the locking chamber 33'.

Behind the upper locking chamber 33, an LED housing section 38 is formed to swell. An LED 39 for indicating a power supplying condition is attached to the LED housing section. A switch 40 for air purge and drive of the cylinder is attached to the rear end of the LED housing section 38.

Figure 6:
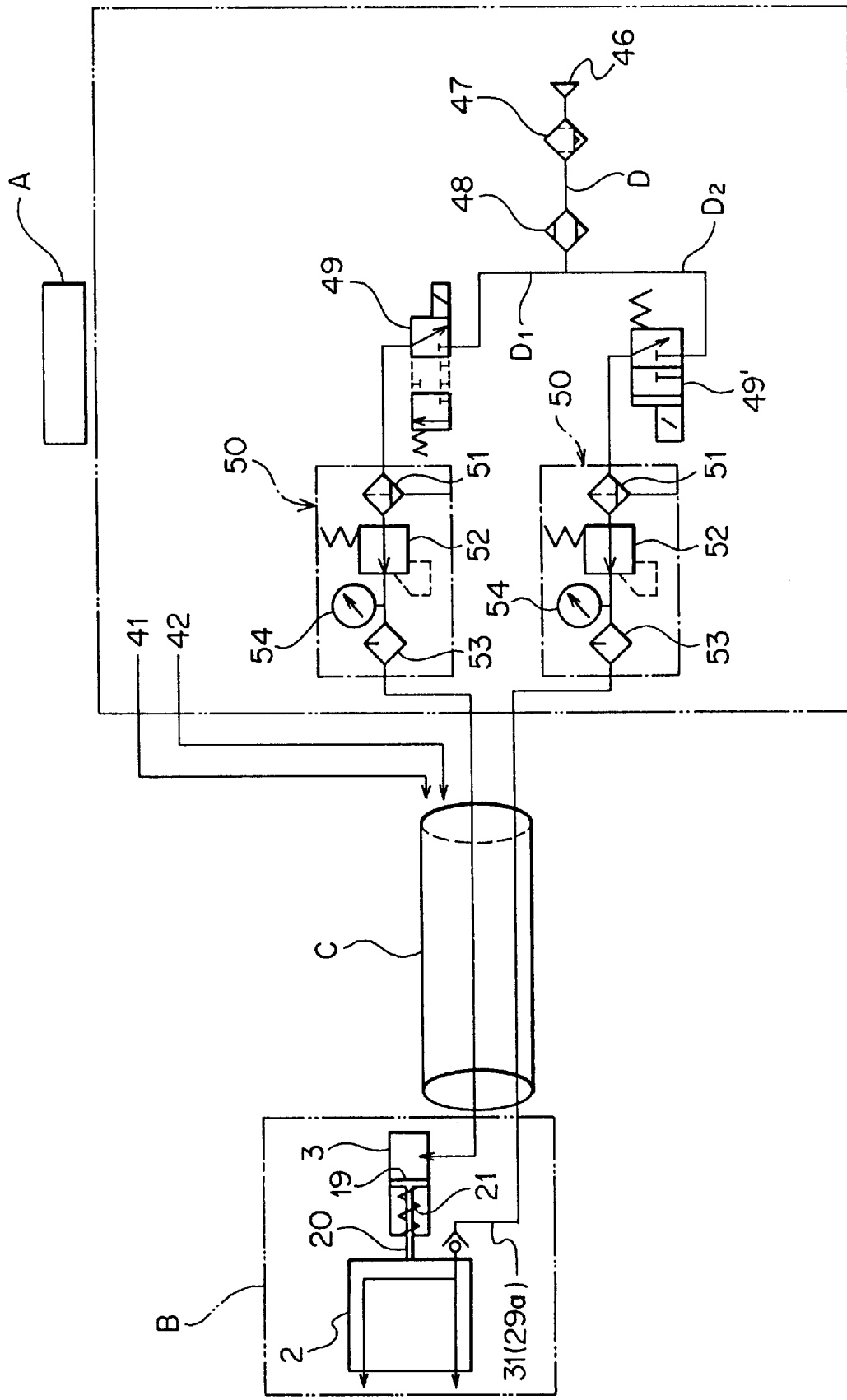
FIG. 6 is a circuit diagram of an air pressure control circuit of the air cylinder 3 shown in FIG. 1.
Figure 7:
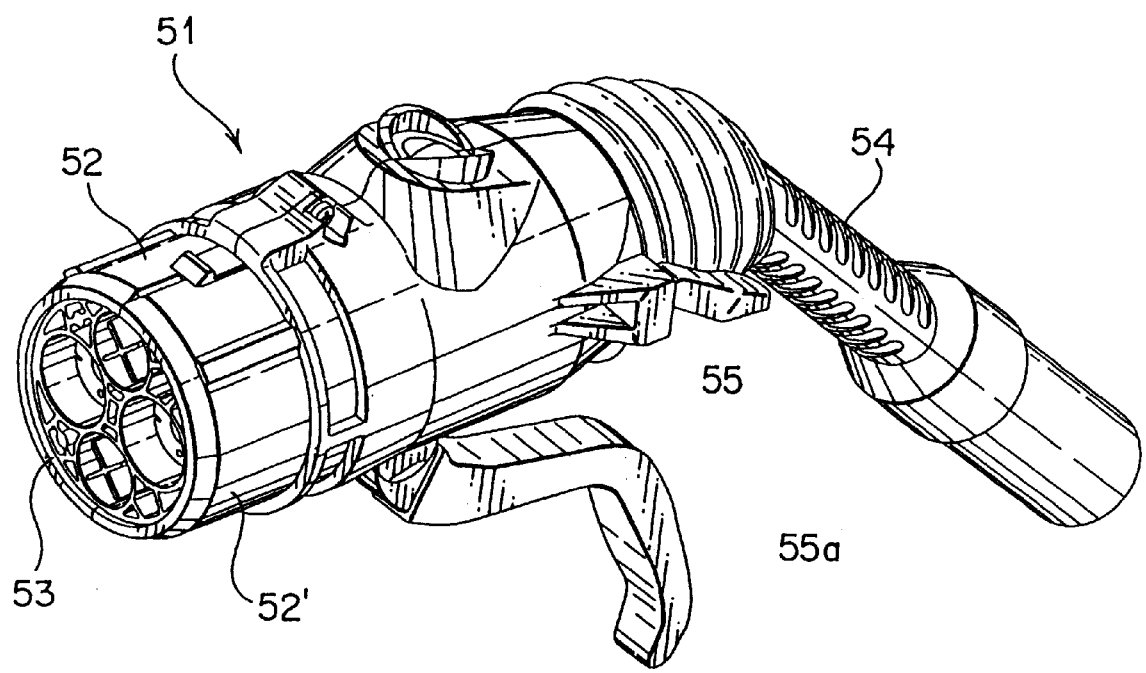
FIG. 7 is an explanation view of a conventional power supplying connector.

The switch 40 is constructed as a two-step switch. When the switch 40 is shifted from an "off" position to a first "on" position, an electromagnetic valve 49' of a branching conduit $D_2$ for air purging which will be described later is opened for a prescribed time. When the switch 40 is shifted from the first "on" position to a second "on" position, an electromagnetic valve 49 of a branching conduit $D_1$ for the air cylinder is opened (FIG. 6). While the timer operates, the switch 40 is set at the second "on" position, the electromagnetic valve 49' is automatically closed to open the electromagnetic valve 49 for the air cylinder.

Figure 5:
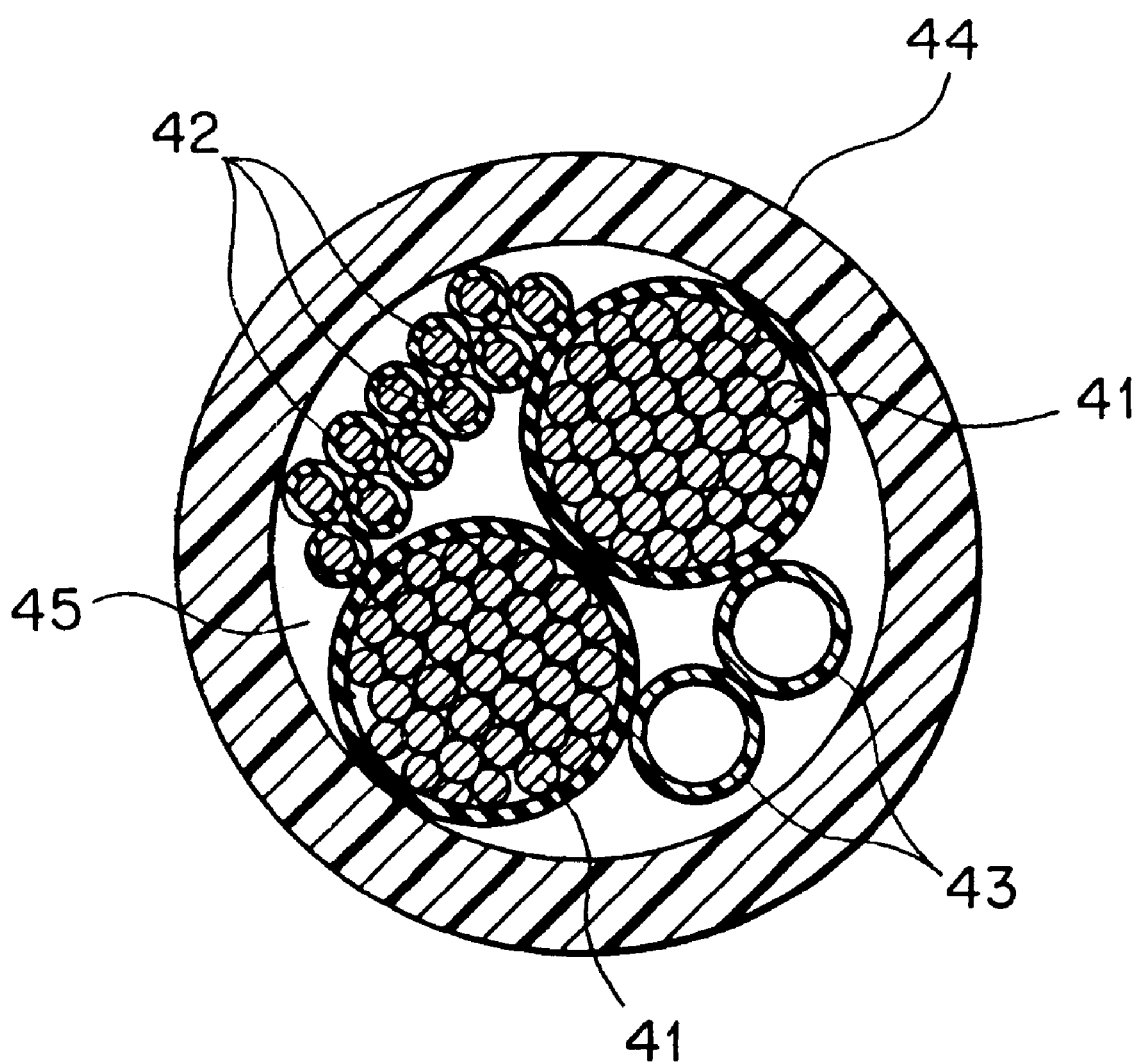
FIG. 5 is a sectional view of a cab tire cable shown in FIG. 3.

FIG. 5 shows the section of the cab tire cable C. The cab tire cable C incorporates two air tubes 43 as well as a pair of electric wires 41 for power, plural pairs of electric wires 42 for signal lines within the an insulating protective tube 44. As shown in FIG. 5, a filling layer 45 is preferably provided to fix the electric wires 41, 42 and the air tube 43 integrally.

The air tube 43 is preferably a nylon pipe, Teflon pipe, polyethylene pipe, vinyl chloride pipe, polypropylene pipe, etc. having a diameter of 5–10 mm which is commercially available. The insulating protective tube 44 is preferably a flexible plastic tube such as vinyl chloride pipe or a synthetic resinpipe. The filling layer 45 is preferably made of a twisted thread or non-woven cloth of cotton or glass fiber.

FIG. 6 is a circuit diagram showing an air pressure control circuit for the power supplying connector B. The charging stand A includes a main air conduit D composed of a compressor 46, an oil mist separator 47 and an air drier 48, and branch conduits $D_1$ and $D_2$ branching into two branches therefrom. The branch conduit $D_1$ ($D_2$) includes an electromagnetic valve 49 (49') and an air pressure regulating unit 50 composed of an air pressure regulating unit 50 composed of a filter 51, a flow rate regulating valve 52, lubricator 53 and pressure meter 4. The air pressure is generally set at 2–5 kg/cm$^2$ by the air pressure regulating unit 50. The tip sides of the air pressure regulating units 50 in the respective branching conduits $D_1$ and $D_2$ are connected to the air cylinder 3 and the air tube 31 for air purging through two air tubes 43 of the cab tire cable C.

An explanation will be given of a method of using the power supplying connector B.

In charging, the switch 40 for air purging and cylinder driving is shifted from an "off" position to the first "on" position. Then, as described above, the electromagnetic valve 49' of the branching conduit $D_2$ for air purging opens so that the compressed air regulated to a constant pressure by the air pressure regulating unit 50 passes through the air tube 43 of the cab tire C, air vent 29a within the air cylinder 3 and air tube 31 in the split-type housings 1A and 1A' and is jet into the hood 8 from the air purge jet opening 32.

Thus, dust or moisture applied to the hood 8 and the power terminal 10 and signal terminal 10' exposed therein are blown off at a moment. Therefore, an accident such as poor contact and short-circuiting can be prevented surely.

When the power supply connector B is inserted into the power receiving connector of a car body (not shown), the drive mechanism for the locking arms 34, 34' composed of the drive pin and follower pin rotates the locking arms 34, 34' in a direction opposite to the arrow P. Thus, the securing pieces 34b and 34b' are engaged with the inner wall of the power receiving connector so that both connectors are coupled with each other provisionally.

In this provisional coupling state, when the switch 40 is located at the second "on" position, the electromagnetic valve 49 of the branching conduit $D_1$ for the air cylinder opens. Thus, in the same manner as described above, the compressed air flows into the air cylinder 3, and the piston 19 advances against the resilient force of the return spring 19. Therefore, the inner housing 2 also advances against the spring 15 urging the insulator cap 14 together with the main shaft 20. Eventually, the power supplying connector B is completely coupled with the power receiving connector. The power terminal 10 and the signal terminal 10' are connected to the corresponding terminals of the power receiving connector.

In this way, since the power supplying connector and the power receiving connector are completely connected by driving the air cylinder 3, simple work but not troublesome work for connector coupling is only required.

The charging operation can be carried out in a complete coupling state between the power supplying connector and the power receiving connector by turning on a power switch (not shown) attached to the charging stand A. During the charging, the LED 39 lights up, and the completion of charging can be known from the blinking of the LED 39.

Upon completion of the charging, the power supplying connector B will be taken off from the power receiving connector.

When the switch 40 is returned to the "off" position, the compressed air in the air cylinder 3 is exhausted so that the piston 19 is moved backward and the inner housing 2 returns to the original position by the resilient force of the spring 15. Then, by operating the releasing lever 37 (see FIGS. 1 and 2) to rotate the one locking arm 34 in a direction reverse to arrow P so that its provisional coupling with the power receiving connector is released. Further, by pulling the power supplying connector B before the operator, the power supplying connector B can be easily separated from the power receiving connector. Incidentally, since the securing arm 34b' of the other locking arm 34' is a semi-locking type as described above, it can be easily released.

In the above description, the advancing drive of the inner housing 2 is carried out using the air cylinder 3, and the air cylinder 3 is integrally formed with the air vent 29a of the air purging jet piece 32, air vent 29a, cab tire cable and air regulating unit which constitute the air purging means for the inner housing 2. However, the air vent 29a may be separated from the air cylinder 3, and the air cylinder 3 may be replaced by the other driving means such as a lever.

What is claimed is:

1. A charging connector for an electric vehicle for charging a power receiving connector coupled with a power supplying connector, wherein said power supplying connector comprises:

an outer housing to be coupled with said power receiving connector;

an inner housing to be slidably mounted on the front half and housing a plurality of terminals; and an air cylinder mounted inside the rear half of said outer housing and having a piston whose main shaft is connected to the rear end of said inner housing, whereby said inner housing is driven toward said power receiving connector by the operation of said air cylinder so that said terminals are connected to corresponding terminals of said power receiving connector.

2. A charging connector for an electric vehicle according to claim 1, wherein said inner housing is provided with a rear holder covering an opening of its rear end through which said main shaft is coupled with said inner housing.

3. A charging connector for an electric vehicle according to claim 1, further comprising a return spring arranged between a front wall of said air cylinder and said piston shaft and serving to urge said piston shaft toward the side opposite to said inner housing.

4. A charging connector for an electric vehicle according to claim 2, further comprising a return spring arranged between a front wall of said air cylinder and said piston shaft and serving to urge said piston shaft toward the side opposite to said inner housing.

5. A charging connector for an electric vehicle according to claim 1, wherein said air cylinder is provided with a pair of approximate switches for determining the stroke of said piston or said inner housing.

6. A charging connector for an electric vehicle according to claim 2, wherein said air cylinder is provided with a pair of approximate switches for determining the stroke of said piston or said inner housing.

7. A charging connector for an electric vehicle according to claim 3, wherein said air cylinder is provided with a pair of approximate switches for determining the stroke of said piston or said inner housing.

8. A charging connector for an electric vehicle according to claim 4, wherein said air cylinder is provided with a pair of approximate switches for determining the stroke of said piston or said inner housing.

* * * * *